United States Patent
Seemeyer et al.

(10) Patent No.: US 12,467,011 B2
(45) Date of Patent: Nov. 11, 2025

(54) LUBRICANT COMPOSITION AND USE THEREOF

(71) Applicant: Klueber Lubrication Muenchen SE & CO. KG, Munich (DE)

(72) Inventors: Stefan Seemeyer, Wolfratshausen (DE); Patrick Wittmeyer, Gerertsried (DE); Maximilian Erhard, Poecking (DE); Maria Frackowiak, Nuremberg (DE); Balasubramaniam Vengudusamy, Munich (DE)

(73) Assignee: KLUEBER LUBRICATION MUENCHEN GMBH & CO. KG, Munich (DE)

( * ) Notice: Subject to any disclaimer, the term of this patent is extended or adjusted under 35 U.S.C. 154(b) by 0 days.

(21) Appl. No.: 17/920,047

(22) PCT Filed: Apr. 21, 2021

(86) PCT No.: PCT/EP2021/060353
§ 371 (c)(1),
(2) Date: Oct. 20, 2022

(87) PCT Pub. No.: WO2021/219456
PCT Pub. Date: Nov. 4, 2021

(65) Prior Publication Data
US 2023/0174885 A1 Jun. 8, 2023

(30) Foreign Application Priority Data
Apr. 27, 2020 (DE) ..................... 10 2020 111 403.6

(51) Int. Cl.
| | | |
|---|---|---|
| *C10M 169/04* | (2006.01) | |
| *C10M 105/38* | (2006.01) | |
| *C10M 107/34* | (2006.01) | |
| *C10M 111/04* | (2006.01) | |
| *C10M 129/76* | (2006.01) | |
| *C10M 133/12* | (2006.01) | |

(Continued)

(52) U.S. Cl.
CPC ........ *C10M 169/04* (2013.01); *C10M 105/38* (2013.01); *C10M 107/34* (2013.01); *C10M 111/04* (2013.01); *C10M 129/76* (2013.01); *C10M 133/12* (2013.01); *C10M 133/44* (2013.01); *C10M 135/10* (2013.01); *C10M 135/18* (2013.01); *C10M 137/04* (2013.01); *C10M 141/10* (2013.01); *C10M 2207/2835* (2013.01); *C10M 2207/284* (2013.01); *C10M 2209/1075* (2013.01); *C10M 2215/26* (2013.01); *C10M 2215/30* (2013.01); *C10M 2219/044* (2013.01); *C10M 2219/066* (2013.01); *C10M 2223/04* (2013.01); *C10N 2020/04* (2013.01); *C10N 2030/10* (2013.01); *C10N 2030/12* (2013.01); *C10N 2040/02* (2013.01); *C10N 2040/04* (2013.01); *C10N 2040/06* (2013.01); *C10N 2040/08* (2013.01); *C10N 2040/32* (2013.01); *C10N 2040/38* (2020.05)

(58) Field of Classification Search
CPC ............ C10N 2040/38; C10N 2040/32; C10N 2030/10; C10N 2020/04; C10N 2030/64; C10N 2040/08; C10N 2040/06; C10N 2020/081; C10N 2030/36; C10N 2030/12; C10N 2040/02; C10N 2040/04; C10N 2010/04; C10M 169/04; C10M 107/34; C10M 141/10; C10M 137/04; C10M 105/38; C10M 135/10; C10M 129/76; C10M 135/18; C10M 111/04; C10M 133/12; C10M 133/44; C10M 2207/026; C10M 2219/066; C10M 2207/284; C10M 2207/3025; C10M 2209/107; C10M 2215/10; C10M 2207/124; C10M 2207/301; C10M 2215/26; C10M 2223/043; C10M 2209/105; C10M 2219/044; C10M 2215/30; C10M 2215/223; C10M 2207/287; C10M 2207/127; C10M 2215/064; C10M 2209/086; C10M 2229/02; C10M 2223/04; C10M 2207/2835; C10M 2209/1075; C10M 2209/108; C10M 2209/106; C10M 2205/02
See application file for complete search history.

(56) References Cited

U.S. PATENT DOCUMENTS

| | | | |
|---|---|---|---|
| 4,302,343 A | 11/1981 | Carswell et al. | |
| 9,029,304 B2 * | 5/2015 | Walker | ................ C10M 141/08 508/556 |

(Continued)

FOREIGN PATENT DOCUMENTS

| | | |
|---|---|---|
| CN | 103756764 B | 8/2016 |
| CN | 110003973 A | 7/2019 |

(Continued)

*Primary Examiner* — Vishal V Vasisth
(74) *Attorney, Agent, or Firm* — LEYDIG, VOIT & MAYER, LTD.

(57) ABSTRACT

A lubricant composition comprising an oil-soluble polyalkylene glycol; an ester compound selected from the group of natural esters and synthetic esters, and combinations thereof; and an additive mixture comprising an antioxidant and an anticorrosive, wherein the anticorrosive is selected from neutral alkali metal and alkaline earth metal salts of sulfonic acids, carboxylic acids, naphthoic acids, naphthenic acids, benzoic acids and phosphoric acids, and derivatives and combinations thereof.

18 Claims, No Drawings

(51) Int. Cl.
  *C10M 133/44* (2006.01)
  *C10M 135/10* (2006.01)
  *C10M 135/18* (2006.01)
  *C10M 137/04* (2006.01)
  *C10M 141/10* (2006.01)
  *C10N 20/04* (2006.01)
  *C10N 30/10* (2006.01)
  *C10N 30/12* (2006.01)
  *C10N 40/00* (2006.01)
  *C10N 40/02* (2006.01)
  *C10N 40/04* (2006.01)
  *C10N 40/06* (2006.01)
  *C10N 40/08* (2006.01)
  *C10N 40/32* (2006.01)

(56) References Cited

U.S. PATENT DOCUMENTS

2013/0035268 A1* 2/2013 Zehler ................. C10M 129/74
  508/202
2017/0121630 A1* 5/2017 Vettel ................. C10M 169/04
2018/0305634 A1* 10/2018 Scholz ................. C10M 107/34
2019/0177648 A1 6/2019 Aoki et al.
2021/0388287 A1 12/2021 Sato

FOREIGN PATENT DOCUMENTS

| | | |
|---|---|---|
| EP | 0017072 A2 | 10/1980 |
| EP | 0359071 A1 | 3/1990 |
| EP | 0524783 A1 | 1/1993 |
| EP | 1707617 A1 | 10/2006 |
| EP | 2837674 A1 | 2/2015 |
| EP | 3119861 A1 | 1/2017 |
| EP | 3290496 A1 | 3/2018 |
| JP | H07166186 A | 6/1995 |
| JP | 2002212580 A | 7/2002 |
| WO | WO 2008/134179 A2 | 11/2008 |
| WO | WO 2012173878 A1 | 12/2012 |
| WO | WO 2015139209 A1 | 9/2015 |
| WO | WO 2020080057 A1 | 4/2020 |

* cited by examiner

LUBRICANT COMPOSITION AND USE THEREOF

CROSS-REFERENCE TO PRIOR APPLICATIONS

This application is a U.S. National Phase application under 35 U.S.C. § 371 of International Application No. PCT/EP2021/060353, filed on Apr. 21, 2021, and claims benefit to German Patent Application No. DE 10 2020 111 403.6, filed on Apr. 27, 2020. The International Application was published in German on Nov. 4, 2021 as WO 2021/219456 under PCT Article 21(2).

FIELD

The present invention relates to biodegradable lubricant compositions and to the use thereof as gear oil, roller bearing oil, hydraulic oil and slide bearing oil in the marine sector and in inland waterways, and in land-based machines and machine elements that can come into contact with water and/or aqueous media.

BACKGROUND

In applications of lubricants or lubricant compositions as gear oil, roller bearing oil, hydraulic oil and slide bearing oil in the marine sector and in inland waterways, i.e. applications in which the lubricants or lubricant compositions are typically used below the waterline at oil-to-water interfaces, there is the risk that the marine or water body environment will be contaminated by escape of lubricant, caused by leaks, for example. Even though attempts are made to seal the water side as best possible in these applications, losses of lubricant are an everyday occurrence. Even lubricants that are used in land-based machines and machine elements, especially in the mining industry, in wind turbines and in agricultural machinery, can come into contact with water via rain, for example. Moreover, leaks frequently occur here too, and so there can be contamination of the environment and pollution of the soil by chemicals.

In the last few years, environmental protection has become ever more important, especially also the protection of the seas. Evidence for this is a variety of new legislation for protection from contamination of the marine environment that requires the use of lubricants that are benign to the marine climate. For example, the Vessel General Permit (VGP) from the United States Environmental Protection Agency for lubricants that are used below the waterline requires the use of what are called Environmentally Acceptable Lubricants (EALs), which have to meet high demands with regard to biodegradability and aquatoxicity.

The selection and usable amount of the base oil components and of the additives for a lubricant is therefore limited. Standard EALs are therefore produced on the basis of natural and synthetic esters, rather than being based on mineral oil as is conventional. By comparison with mineral oil-based lubricants, however, there is frequently damage to seal materials when EALs are used.

In the marine sector and in inland waterways, and in land-based machinery and machinery elements, generally radial shaft slip rings that are typically manufactured from elastomer materials such as FKM (fluoro rubber), NBR (nitrile-butadiene rubber), HNBR (hydrogenated nitrile-butadiene rubber), ACM/AEM (acrylate elastomers/ethylene acrylic elastomers) and polyurethanes are used in order to seal slide bearings such as the stern tube, gears such as azipods and linear guides, for example in side rudder stabilizers. Damage to seals that ultimately results in leaks is especially caused by incompatibility of lubricant and seal material. Therefore, the selection of the base oil component(s) for the lubricant and the carefully matched selection of additives is essential in order to assure not only good biocompatibility but also material compatibility of the lubricant and hence to prevent damage to seal materials.

WO 2012/173878 A1 describes ester-based lubricant compositions comprising water-soluble polyalkylene glycols based on ethylene oxide and propylene oxide.

WO 2015/139209 A1 describes a lubricant that comprises an alcohol-initiated propylene oxide homopolymer and an oil-soluble polyalkylene glycol and does not require an ester-based base oil.

EP 2 837 674 A1 describes a lubricant oil composition that may comprise a base oil mixture of synthetic polyglycol-based oils and a synthetic esters-based oil, and additionally comprises an asymmetric amine-based antioxidant.

However, there is still a need for environmentally benign lubricants that reduce the pollution of seas, inland waterways and soil by chemicals, and which have high compatibility with respect to seal materials, especially elastomer materials, and which additionally meet the customary requirement on the lubrication of, for example, slide bearings, gears, linear guides, pneumatic components, instruments, roller bearings, chains, cables, springs and propellers etc.

SUMMARY

In an aspect, disclosed is a lubricant composition comprising an oil-soluble polyalkylene glycol; an ester compound selected from the group of natural esters and synthetic esters, and combinations thereof; and an additive mixture comprising an antioxidant and an anticorrosive, wherein the anticorrosive is selected from neutral alkali metal and alkaline earth metal salts of sulfonic acids, carboxylic acids, naphthoic acids, naphthenic acids, benzoic acids and phosphoric acids, and derivatives and combinations thereof.

DETAILED DESCRIPTION

It was therefore an object of the present invention to provide lubricants or lubricant compositions that have improved compatibility with respect to seal materials, especially elastomers, which have good lubrication properties and good lubricity, which are biocompatible, i.e. have good biodegradability and minimal aquatoxicity, and which are suitable for use as gear oil, roller bearing oil, hydraulic oil and slide bearing oil in the marine sector and in inland waterways, and in land-based machines and machine elements that can come into contact with water and/or aqueous media.

In the context of the invention, the terms "lubricant composition", "lubricant", "lubricant oil" and "formulation" are used synonymously.

One or more of the aforementioned objects are achieved by a lubricant composition comprising an oil-soluble polyalkylene glycol, an ester compound selected from the group of natural esters and synthetic esters, and combinations thereof, and an additive mixture comprising an antioxidant and an anticorrosive, wherein the anticorrosive is selected from neutral alkali metal and alkaline earth metal salts of sulfonic acids, carboxylic acids, naphthoic acids, naphthenic acids, benzoic acids and phosphoric acids, and derivatives and combinations thereof.

It has been found that, surprisingly, in the case of the lubricant composition of the invention which, as defined above, comprises an oil-soluble polyalkylene glycol, an ester compound and an additive mixture as components, wherein the additive mixture comprising an antioxidant and a neutral anticorrosive, the components act synergistically. The lubricant composition of the invention therefore surprisingly shows the advantage of improved compatibility with respect to seal materials, especially elastomer materials such as FKM, NBR, HNBR, ACM/AEM, or polyurethanes. Moreover, the lubricant composition of the invention has good lubrication properties and generally additionally features good biodegradability and aquatoxicity, such that it is of excellent suitability for use as gear oil, roller bearing oil, hydraulic oil or slide bearing oil in the marine sector and in inland waterways, and in land-based machines and machine elements that can come into contact with water and/or aqueous media.

According to the invention, the lubricant composition comprises an oil-soluble polyalkylene glycol (OSP) as base oil component, which, in the context of the invention, also includes mixtures of two or more different oil-soluble polyalkylene glycols.

In the context of the invention, a polyalkylene glycol is "oil-soluble" when, after being mixed with polyalphaolefin 6 (commercially available, for example, as Synfluid® PAO 6 cSt or Durasyn® 166 Polyalphaolefins), in each case in weight ratios of 10:90, 50:50 and 90:10, and after the mixtures have been left to stand at room temperature for 24 hours, no phase separation occurs in at least two of the three mixtures.

In a preferred embodiment of the present invention, the oil-soluble polyalkylene glycol is a copolymer selected from polybutylene oxide-polypropylene oxide copolymers, polybutylene oxide-polyethylene oxide copolymers, and polybutylene oxide-polypropylene oxide-polyethylene oxide copolymers, and combinations thereof, particular preference being given to polybutylene oxide-polypropylene oxide copolymers. In addition, it is preferable when the copolymer is alcohol-initiated, i.e. when an alcohol was used as initiator of the polymerization reaction in the production thereof, as described in more detail hereinafter.

More preferably, the oil-soluble polyalkylene glycol is a copolymer selected from polyisobutylene oxide-polyisopropylene oxide copolymers, polyisobutylene oxide-polyethylene oxide copolymers and polyisobutylene oxide-polyisopropylene oxide-polyethylene oxide copolymers, and combinations thereof, very particular preference being given to polyisobutylene oxide-polyisopropylene oxide copolymers.

It is especially preferable here when, in the aforementioned copolymers, the proportion of (polymerized) monomer units derived from butylene oxide or isobutylene oxide (i.e. polybutylene oxide (BO) or polyisobutylene oxide (iBO) units) is 40 percent by weight (% by weight) or more, more preferably 50% by weight or more, for example 60% by weight or more, or 65% by weight or more, and preferably 80% by weight or less, more preferably 70% by weight or less, based on the total weight of all monomer units in the copolymer. Very particular preference is given to a polyalkylene glycol copolymer having 50% by weight of butylene oxide- or isobutylene oxide-derived (polymerized) monomer units (i.e. BO or iBO units) and 50% by weight of propylene oxide-derived (polymerized) monomer units (i.e. polypropylene oxide (PO) or polyisopropylene oxide (iPO) units), based on the total weight of BO (or iBO) and PO (or iPO) units in the copolymer. This means that BO (or iBO) and PO (or iPO) units are most preferably copolymerized with a weight ratio of 50:50.

According to the invention, the oil-soluble polyalkylene glycol copolymer may be a random copolymer, a gradient, an alternating copolymer, a graft copolymer or a block copolymer, preference being given to random copolymers and block copolymers, and especially random copolymers.

In addition, it is preferable when the oil-soluble polyalkylene glycol is an alcohol-initiated polyalkylene glycol. This means that the oil-soluble polyalkylene glycol used in accordance with the invention is preferably a polyalkylene glycol which is prepared using alcohol as initiator of the polymerization reaction, where the alcohol comprises preferably 10-20 carbon atoms, more preferably 12-20 carbon atoms, such that the polyalkylene glycol has a C10-C20-alkyl radical (preferred) or C12-C20-alkyl radical (particularly preferred) bonded to at least one terminal end thereof, which results from the starter reaction of the alcohol with an alkylene oxide. Further preferably, the alcohol initiator is a linear alcohol, and especially a primary linear alcohol. In addition, the alcohol initiator may be a mono-, di- or trialcohol, preference being given to a monoalcohol.

When the alcohol used as polymerization initiator comprises 10-20 carbon atoms, or when the alcohol-initiated polyalkylene glycol has a C10-C20-alkyl radical bonded to at least one terminal end, the compounds added as additives, especially antioxidants and anticorrosives (see below), can be better dissolved therein. A very particularly preferred alcohol initiator in this regard is n-dodecanol.

According to the invention, it is therefore especially preferable when the oil-soluble polyalkylene glycol is a dodecanol-initiated polyalkylene glycol copolymer, particular preference being given to dodecanol-initiated polybutylene oxide-polypropylene oxide copolymers, and very particular preference to polyisobutylene oxide-polyisopropylene oxide copolymers.

It is additionally preferable that the oil-soluble polyalkylene glycol has a number-average molecular weight (Mn) of 500 g/mol (grams per mole) or more, more preferably of 750 g/mol or more, for example 1000 g/mol or more, or 1250 g/mol or more. It is additionally preferable that the molecular weight of the oil-soluble polyalkylene glycol is 1400 g/mol or less, and Mn is more preferably less than 1400 g/mol.

Unless explicitly stated otherwise, molecular weight in the context of this invention refers to "number-average molecular weight (Mn)".

Molecular weight is determined by means of GPC (gel permeation chromatography) against a polystyrene standard.

Oil-soluble polyalkylene glycols having a molecular weight Mn of 500 g/mol or more to 1400 g/mol or less are advantageous with regard to their biodegradability. It has additionally been found that the use of such oil-soluble polyalkylene glycol copolymers has an advantageous effect on the compatibility of the lubricant composition with respect to elastomer materials.

In a further preferred embodiment of the invention, the oil-soluble polyalkylene glycol is biodegradable according to standard OECD 301 A-F or OECD 306, in order to achieve improved biodegradability and environmental compatibility of the lubricant composition of the invention.

In addition, the oil-soluble polyalkylene glycol preferably has a kinematic viscosity at 40° C. von 15 mm$^2$/s or higher, more preferably 18 mm$^2$/s or higher, especially preferably 32 mm$^2$/s or higher, for example 68 mm$^2$/s cSt or higher, and of 130 mm²/s or less, more preferably 100 mm²/s or less. Viscosity is determined according to ASTM D 7042.

Oil-soluble polyalkylene glycols suitable in accordance with the invention are commercially available, for example under the UCON™ OSP-18, UCON™ OSP-32, UCON™ OSP-68 and UCON™ OSP-680 brand names.

The amount of the oil-soluble polyalkylene glycol in the lubricant composition is generally determined by the amount of the further constituents/components present in the composition, meaning that the lubricant composition is made up to 100% by weight by the oil-soluble polyalkylene glycol. However, the amount of the oil-soluble polyalkylene glycol is preferably 0.1-70% by weight, more preferably 5-70% by weight, and most preferably 10-70% by weight, based on the total weight of the lubricant composition.

The lubricant composition of the invention additionally comprises, as a further base oil component, an ester compound selected from the group of natural esters and synthetic esters, and combinations thereof, which, in accordance with the invention, also includes mixtures of two or more different natural esters or mixtures of two or more different synthetic esters.

In a preferred embodiment of the present invention, the ester compound is selected from natural glyceride esters, especially from the group of sunflower oil, rapeseed oil or colza oil, linseed oil, corn oil, safflower oil, soybean oil, linseed oil, peanut oil, "lesquerella" oil, palm oil, olive oil, each of which may be in monomeric, oligomeric and/or polymerized form; and synthetic esters from the group of polyol esters, polyol complex esters, complex esters of dimer acids, dimer acid esters, aliphatic carboxylic acid and dicarboxylic esters, phosphate esters and trimellitic and pyromellitic esters and estolides; and combinations thereof.

More preferably, the ester compound is selected from polyol esters, especially those that are obtained by reaction of polyhydric alcohols (i.e. polyols or alcohols having more than one hydroxyl group) with monocarboxylic acids (i.e. monobasic carboxylic acids), and polyol complex esters, especially those that are obtained by reaction of polyhydric alcohols with monocarboxylic acids and dicarboxylic acids (i.e. dibasic carboxylic acids) in any mixture, and combinations thereof.

More preferably, the polyol esters used in accordance with the invention are prepared by reaction/esterification of one or more polyhydric alcohols selected from neopentyl glycol (NPG), trimethylolpropane (TMP) and pentaerythritol (PE), or dimers or trimers thereof, with one or more linear and/or branched monocarboxylic acids of chain length C4-C36 (i.e. 4 to 36 carbon atoms), preferably C10-36, more preferably C14-C36, and most preferably C18-C36, which may be saturated and/or mono- or polyunsaturated, and are preferably saturated.

Likewise more preferably, the polyol complex esters used in accordance with the invention are prepared by reaction/esterification of one or more polyhydric alcohols selected from neopentyl glycol (NPG), trimethylolpropane (TMP) and pentaerythritol (PE), or dimers or trimers thereof, in any mixture with one or more linear and/or branched monocarboxylic acids of chain length C4-C36, preferably C10-36, more preferably C14-C36, and most preferably C18-C36, which may be saturated and/or mono- or polyunsaturated, and are preferably saturated, and one or more linear and/or branched dicarboxylic acids of chain length C4-C36, preferably C4-C18, more preferably C4-C12, which may be saturated and/or mono- or polyunsaturated, and are preferably saturated.

The polyol complex esters obtained here may be fully esterified or partly esterified (meaning that there are still free, unesterified hydroxyl groups).

In a very particularly preferred embodiment of the invention, the ester compound is therefore selected from neopentyl glycol esters, trimethylolpropane esters and pentaerythritol esters that have especially been esterified with saturated and/or mono- or polyunsaturated, linear and/or branched monocarboxylic acids of chain length C4-C36, preferably C10-36, more preferably C14-C36, and most preferably C18-C36; and neopentyl glycol complex esters, trimethylolpropane complex esters and pentaerythritol complex esters that have been fully esterified or partly esterified, in particular with saturated and/or mono- or polyunsaturated, linear and/or branched monocarboxylic acids of chain length C4-C36, preferably C10-36, more preferably C14-C36, and most preferably C18-C36, and with saturated and/or mono- or polyunsaturated, linear and/or branched dicarboxylic acids of chain length C4-C36, preferably C4-C18, more preferably C14-C12, in any mixture; and combinations thereof.

Examples of particularly preferred ester compounds are pentaerythritol tetraisostearate, pentaerythritol tetraoleate, pentaerythritol isostearate sebacate complex ester, trimethylolpropane triisostearate, trimethylolpropane trioleate, trimethylolpropane tricaprylate, trimethylolpropane isostearate stearate sebacate complex ester, neopentyl glycol diisostearate, without being limited thereto.

Suitable ester compounds are also commercially available, for example under the Priolube 3987, Radialube 7257, Synative ES 1200, Priolube 1973, Synative ES TMP 05/140, Palub 8433, Nycobase 8397, Estilube P 688, Rümanox 804 brand names.

It has been found that the presence/addition of such ester compounds, and especially of those that contain the residue of a monocarboxylic acid of chain length C18-C36, has an advantageous effect on compatibility with respect to elastomer materials. The above-defined ester compounds generally additionally feature good biodegradability.

In a further preferred embodiment of the invention, ester compounds which are biodegradable according to standard OECD 301 A-F or OECD 306 are used, in order to achieve improved biodegradability and environmental compatibility of the lubricant composition of the invention.

The ester compound is present in the lubricant composition of the invention preferably in an amount of 0.1-85% by weight, more preferably of 5-85% by weight, especially preferably of 10-85% by weight, and very especially preferably of 15-85% by weight, based on the overall lubricant composition.

In a particularly preferred embodiment of the invention, the oil-soluble polyalkylene glycol and the ester compound are the only base oil components in the lubricant composition, meaning that the lubricant composition of the invention contains, as base oil components, solely oil-soluble polyalkylene glycol—a single compound or a mixture of different OSPs—and ester compound—a single compound or a mixture of different ester compounds—but no further base oil components, especially no mineral oil.

The weight ratio of "oil-soluble polyalkylene glycol" and "ester compound" based on the total weight of those two components in the lubricant composition is preferably in the range from 5:95 to 95:5, more preferably from 10:90 to 80:20, and especially preferably from 15:85 to 70:30.

The lubricant composition of the invention further comprises an additive mixture comprising an antioxidant and an anticorrosive. The antioxidant and the anticorrosive may each be present in the lubricant composition as a single substance or as a mixture of different antioxidants or anticorrosives. The same also applies to any other additive that may be present in the lubricant composition.

The controlled addition of additives can achieve the effect that particular properties of lubricant are improved and/or particular properties are imparted to the lubricant.

The addition of anticorrosives imparts a corrosion- and rust-inhibiting effect to the lubricant composition.

According to the invention, the anticorrosive is selected from neutral alkali metal and alkaline earth metal salts of sulfonic acids, carboxylic acids, naphthenic acids, naphthoic acids, benzoic acids and phosphoric acids, and combinations thereof. In the context of the present invention, this also includes derivatives of the acids/acid salts mentioned, including linear and branched aliphatic and aromatic derivatives of these acids/acid salts which may additionally be substituted by one or more radicals selected from linear and/or branched alkyl radicals and aryl radicals. Among the alkali metal and alkaline earth metal salts of these acids, preference is given to the Na, Ca, K and Mg salts, and particular preference to Ca salts, especially for reasons of environmental compatibility.

"Neutral" acid salts in the context of the present invention are understood to mean acid salts having a total acid number (TAN) of 30 mg KOH/g or less.

It is therefore preferable in the context of the present invention that the anticorrosive, or the neutral sulfonic acid salt, carboxylic acid salt, naphthenic acid salt, naphthoic acid salt, benzoic acid salt or phosphoric acid salt used, or mixtures thereof, has a TAN of 30 mg KOH/g or less, more preferably 20 mg KOH/g or less, especially preferably 15 mg KOH/g or less, and very especially preferably 10 mg KOH/g or less.

In a particularly preferred embodiment, the anticorrosive is selected from neutral calcium sulfonates. These have been found to be particularly advantageous with regard to compatibility of the lubricant composition with respect to elastomer materials. One example of an anticorrosive which is particularly suitable in accordance with the invention is neutral alkylnaphthalenesulfonic acid calcium salts, without limitation thereto.

Suitable neutral anticorrosives are commercially available, for example under the NA-SUL® CA-770 FG or NA SUL® CA 1089 brand names.

It has been found that, surprisingly, the controlled addition of the neutral acid salts as defined above to the lubricant composition, in addition to the corrosion- and rust-inhibiting action, achieves an improvement in compatibility of the lubricant composition with respect to seal materials, especially elastomer materials, which especially results from synergistic interaction with the other components of the lubricant composition.

The addition of antioxidants can increase the oxidation stability of the lubricant composition.

In a preferred embodiment of the present invention, the antioxidant is selected from phenolic antioxidants (phenol compounds), aminic antioxidants (amine compounds), phosphites and sulfur compounds, especially alkyl and aryl sulfides, sulfur-containing phenol compounds and sulfur-containing carboxylic acids, phosphorothionates, thiocarbamates and dithiocarbamates, thiophosphates and thiopropionates, and combinations thereof, particular preference being given to phenolic antioxidants, aminic antioxidants, thiocarbamates and dithiocarbamates. Most preferably, the antioxidant is selected from aminic antioxidants, and especially from linear or branched aliphatic amine compounds and aromatic amine compounds and salts thereof, where the aliphatic and aromatic amine compounds may be substituted by one or more radicals selected from linear and/or branched alkyl radicals and aryl radicals.

Preferred antioxidants are selected from aromatic diamines and secondary aromatic amines, phenolic resins, thiophenolic resins, zinc thiocarbamate, zinc thiophosphate, organic thiocarbamates and dithiocarbamates, butylated hydroxytoluene, butylated hydroxyanisole, phenyl-alpha-naphthylamines, phenyl-beta-naphthylamines, diphenylamine and diphenylamine derivatives, especially octylated diphenylamines, butylated diphenylamines and styrenized diphenylamines, quinoline and quinoline derivatives, naphthylamine and naphthylamine derivatives, di-alpha-tocopherol, di-tert-butyl-phenylpropanoic acid and esters thereof, and mixtures thereof, without limitation thereto.

Examples of antioxidants that are particularly preferred in accordance with the invention are benzeneamine-, N-phenyl-, reaction products with 2,4,4-trimethylpentene, octadecyl 3-(3,5-di-tert-butyl-4-hydroxyphenyl)propionate, bis (4-(1,1,3,3-tetramethylbutyl)phenyl)amine, N-[(1,1,3,3-tetramethylbutyl)phenyl]naphthalene-1-amine 4,4'-methylenebis(dibutyldithiocarbamate), without limitation thereto.

Suitable antioxidants are commercially available, for example under the Vanlube® 81, Irganox® L 57, Vanlube® 1202 or Irganox® L 107 ADDITIN RC 6340 brand names.

It has been found that, surprisingly, the specific selection of the antioxidant, especially the specific use of amine compounds, phenol compounds and/or thiocarbamates and dithiocarbamates as antioxidants, in addition to the increase in oxidation stability, can achieve an improvement in the compatibility of the lubricant composition with respect to seal materials, especially elastomer materials, which especially results from a synergistic interaction with the other components of the lubricant composition.

The amount of the additive mixture in the lubricant composition, i.e. the total amount of all additives in the lubricant composition, is preferably 0.1-20% by weight, more preferably 0.1-10% by weight, and especially preferably 0.1-5% by weight, based on the overall lubricant composition. The amount of the antioxidant is preferably in the range of 0.05-3.5% by weight, and the amount of the anticorrosive is preferably in the range of 0.05-3.5% by weight, based in each case on the overall lubricant composition, without exceeding the above-defined total amount of all additives.

In a preferred embodiment, the present invention therefore relates to a lubricant composition comprising
  an oil-soluble polyalkylene glycol;
  in an amount of 0.1-85% by weight, based on the overall lubricant composition, an ester compound selected from the group of natural esters and synthetic esters, and combinations thereof; and
  in an amount of 0.1-20% by weight, based on the overall lubricant composition, an additive mixture comprising an antioxidant and an anticorrosive,
  where the anticorrosive is selected from neutral alkali metal and alkaline earth metal salts of sulfonic acids, carboxylic acids, naphthenic acids, naphthoic acids, benzoic acids and phosphoric acids, and derivatives and combinations thereof, and where the components present add up to a total of 100% by weight and are as defined above.

In a further preferred embodiment of the invention, the additive mixture, in addition to the antioxidant(s) and anticorrosive(s), comprises a nonferrous metal deactivator, which, in the context of the invention, includes both single compounds and mixtures of two or more different nonferrous metal deactivators.

The addition of nonferrous metal deactivators can protect non-iron metals, for example cadmium (Cd), cobalt (Co), copper (Cu), nickel (Ni), lead (Pb), tin (Sn), and zinc (Zn), which are among what are called the nonferrous metals, and alloys thereof, from corrosion by active sulfur.

The nonferrous metal deactivator is preferably selected from triazoles, mercaptothiadiazoles and salicylates, and combinations thereof, particular preference being given to triazoles and especially benzotriazoles. In the context of the present invention, the terms "triazoles" and "benzotriazoles" also include triazole derivatives or benzotriazole derivatives, and also reaction mixtures and reaction masses in which these are present as a single compound or in a multitude.

Examples of nonferrous metal deactivators that are particularly suitable in accordance with the invention are benzotriazole and tolyltriazole and derivatives thereof, N,N-bis(2-ethylhexyl)-ar-methyl-1H-benzotriazole-1-methanamine, and a reaction mixture composed of N,N-bis(2-ethylhexyl)-6-methyl-1H-benzotriazole-1-methanamine, N,N-bis(2-ethylhexyl)-4-methyl-2H-benzotriazole-2-methanamine, N,N-bis(2-ethylhexyl)-5-methyl-2H-benzotriazole-2-methanamine, N,N-bis(2-ethylhexyl)-4-methyl-1H-benzotriazole-1-methylamine and N,N-bis(2-ethylhexyl)-5-methyl-1H-benzotriazole-1-methylamine, without limitation thereto.

Suitable nonferrous metal deactivators are commercially available, for example under the Irgamet® 39 or Irgamet® BTZ brand names.

The specific selection of the nonferrous metal deactivator, especially the specific use of triazoles or benzotriazoles, in addition to the protection from corrosion by active sulfur, can achieve a further improvement in the compatibility of the lubricant composition with respect to seal materials, especially elastomer materials, which especially results from a synergistic interaction with the other components of the lubricant composition.

In a further preferred embodiment, the present invention therefore relates to a lubricant composition comprising
an oil-soluble polyalkylene glycol;
in an amount of 0.1-85% by weight, based on the overall lubricant composition, an ester compound selected from the group of natural esters and synthetic esters, and combinations thereof; and
in an amount of 0.1-20% by weight, based on the overall lubricant composition, an additive mixture comprising an antioxidant, an anticorrosive and a nonferrous metal deactivator,
wherein the anticorrosive is selected from neutral alkali metal and alkaline earth metal salts of sulfonic acids, carboxylic acids, naphthenic acids, naphthoic acids, benzoic acids and phosphoric acids, and combinations thereof, and where the components present add up to a total of 100% by weight and are as defined above.

The lubricant composition of the invention, or the additive mixture used, in addition to antioxidant(s), anticorrosive(s) and optionally nonferrous metal deactivator(s), may comprise one or more further additives that are especially selected from antiwear agents, friction modifiers, high-pressure additives, ion complex formers, solid lubricants, dispersants, pour point and viscosity improvers, UV stabilizers, emulsifiers, color indicators, lubricity improvers and defoamers, without limitation thereto.

Antiwear agents, friction modifiers and high-pressure additives that are suitable in accordance with the invention are preferably selected from amines, amine phosphates, branched and/or linear alkylated phosphates, phosphites, thiophosphates, and phosphothionates, aryl phosphates, aryl thiophosphates, alkylated polysulfides, sulfonated amine compounds, sulfonated fatty acid methyl esters, naphthenic acids, nanoparticles selected from $Al_2O_3$, $SiO_2$, $TiO_2$, $ZrO_2$, $WO_3$, $Ta_2O_5$, $V_2O_5$, $CeO_2$, aluminum titanate, BN, $MoSi_2$, SiC, $Si_3N_4$, TiC, TiN, $ZrB_2$, clay minerals and mixtures thereof, sulfonic salts, and thermally stable carbonates and sulfates, and also mixtures of two or more of these, without limitation thereto. Suitable commercially available additives are, for example, the following products: IRGALUBE® TPPT, IRGALUBE® 232, IRGALUBE® 349, IRGALUBE® 353, IRGALUBE® 211 and ADDITIN® RC3760 Liq 3960, FIRC-SHUN® FG 1505 and FG 1506, NA-LUBE® KR-015FG, LUBEBOND®, FLUORO® FG, SYNALOX® 40-D, ACHESON® FGA 1820 and ACHESON® FGA 1810.

Suitable viscosity improvers are preferably selected from linear and branched alkylated, acrylated and aliphatic polymers and copolymers, and polymerized fatty acid esters, and mixtures of two or more of these. Examples of suitable viscosity improvers are polymethacrylate, ethylene-propylene copolymer, polyisobutylene, polyalkylstyrene, hydrogenated styrene isoprene copolymer, without limitation thereto. Suitable viscosity improvers are commercially available.

Suitable UV stabilizers are preferably selected from nitrogen heterocycles and substituted nitrogen heterocycles, and mixtures of two or more of these, without limitation thereto. Suitable UV stabilizers are commercially available.

Suitable solid lubricants are preferably selected from PTFE, boron nitride, zinc oxide, magnesium oxide, pyrophosphates, thiosulfates, magnesium carbonate, calcium carbonate, calcium stearate, zinc sulfide, molybdenum sulfide, tungsten sulfide, tin sulfide, graphite, graphene, nanotubes, Sift polymorphs, and mixtures of two or more of these, without limitation thereto. Suitable solid lubricants are commercially available.

Suitable emulsifiers are preferably selected from branched and/or linear ethoxylated and/or propoxylated alcohols and salts thereof, especially alcohols having chain lengths of 14-18 carbon atoms, ethoxylated and/or propoxylated alkyl ethers, fatty acid esters, and ionic surfactants, for example sodium salts of alkylsulfonic acids, and mixtures of two or more of these, without limitation thereto. Suitable emulsifiers are commercially available.

The addition of defoamers prevent the formation of foam. Suitable defoamers are preferably selected from ethoxylated and/or propoxylated alcohols having chain lengths of 10-18 carbon atoms, mono- and diglycerides of edible fats, acrylates, propoxylated and/or ethoxylated alkyl ethers, polyols including diols, and polysiloxanes such as silicone oils or polydimethylsiloxanes, and mixtures of two or more of these, without limitation thereto. Suitable defoamers are commercially available.

One example of a suitable color indicator is 2,5-thiophenediylbis(5-ter-butyl-1,3-benzoxazole), without limitation thereto. Suitable color indicators are commercially available.

A lubricity improver in the context of the present invention is an organic compound comprising both a polar moiety and a nonpolar moiety. The term "organic compound" includes both single compounds (i.e. molecules) and mixtures of single compounds, and also oligomers and polymers including homopolymers, copolymers and polymer blends, and mixtures thereof.

The addition of the lubricity improver to the lubricant composition can achieve an improvement in the lubrication properties of the lubricant composition, especially also at low gear and bearing speeds and high stress.

Preferred examples of organic compounds that can advantageously be used as lubricity improver in the lubricant composition of the invention are the following compounds, without limitation thereto: maleic acid-olefin copolymers (commercially available, for example, as Ketjenlube® 135, Ketjenlube® 2700, Ketjenlube® 23000); modified polyesters (commercially available, for example, as Perfad™ 3000, Perfad™ 3050); polymethylmethacrylate (PMMA), linear polymers and star polymers (commercially available, for example, as Lubrizol 87725); oleic acid, especially mixtures of C16-C18 fatty acids and C18 unsaturated fatty acids (commercially available, for example, as Herwemag OA); glycerol monooleates (GMO), especially those with mono content min. 40%, free glycerol max. 6% (commercially available, for example, as Ilco Lube 2316); polymethacrylate (PMA), linear polymers and comb polymers (commercially available, for example, as Viscoplex® 3-200); copolymers of 1-decene and 9-dodecyl acid methyl ester (commercially available, for example, as Elevance Aria® WTP 40); pentaerythritol tetraisostearate (commercially available, for example, as Priolube™ 3987-LQ).

Since the additives serve to improve particular properties of the lubricant and/or to impart particular properties thereto, they may, depending on the requirement or demand on the lubricant, be added thereto as a single substance or as a mixture of two or more additives, without limitation of the amount of the additives in the additive mixture, provided that the total amount of all additives, based on the overall lubricant composition, is not above or below that as defined above.

In a further preferred embodiment of the invention, the acid number of the overall lubricant composition is 30 mg KOH/g or less, more preferably 20 mg KOH/g or less, especially preferably 15 mg KOH/g or less, and very especially preferably 10 mg KOH/g or less.

In a further preferred embodiment, the lubricant composition has a kinematic viscosity at 40° C. of 20 mm$^2$/s to 680 mm$^2$/s, more preferably of 30 mm$^2$/s to 480 mm$^2$/s and most preferably of 60 mm$^2$/s to 150 mm$^2$/s. Viscosity is measured to ASTM D 7042.

In a further preferred embodiment, the lubricant composition is biodegradable according to standard OECD 301 A-F or OECD 306 and/or has low aquatoxicity according to standard OECD 201, 202, 203 or 236.

It has been found that, surprisingly, the lubricant composition of the invention described herein, which, as defined above, comprises an oil-soluble polyalkylene glycol, an ester compound and an additive mixture comprising an antioxidant and a neutral anticorrosive as components, shows the advantage of improved compatibility with respect to seal materials, especially elastomers, which especially results from a synergistic interaction of the components. The lubricant composition of the invention additionally has good lubrication and sliding capacity, and good biodegradability and environmental compatibility.

The lubricant composition of the invention is therefore of excellent suitability for use as gear oil, roller bearing oil, hydraulic oil or slide bearing oil in the marine sector and in inland waterways, and in land-based machines and machine elements that can come into contact with water and/or aqueous media.

The present invention therefore further relates to the use of the lubricant composition of the invention described herein as gear oil, roller bearing oil, hydraulic oil and slide bearing oil in the marine sector and in inland waterways, and in land-based machines and machine elements that can come into contact with water and/or aqueous media.

Fields of use in the marine sector and in inland waterways especially include the lubrication of gears, hydraulics, bearings, such as slide, roller or stern tube bearings, propeller rudders, propeller shafts, pneumatic components, linear guides, chains and cables in machines, machine components and installations that come into contact with saltwater in the marine sector, for example offshore installations, or with (fresh)water and/or aqueous media in inland waterways, without being limited thereto.

In the marine sector, gears are used, for example, in thrusters and azipods. This use serves for transmission of force and conversion of force which takes place between drive and propeller. Both ingress of water into the interior and escape of lubricant into the marine environment is to be expected here.

A further application in the marine sector is that of jackup systems that jack up platforms, installation ships for wind turbines or oil rigs. This movement is accomplished by open gears.

Hydraulics in the marine sector serve to drive adjustable propeller rudders, and in fin stabilizers and rudder bearings. Linear guides are also used in the latter, which are usually lubricated with the same lubricant. Here too, lubrication takes place below the waterline. Accordingly, in this case too, ingress of water into machine parts and escape of lubricant into the marine environment is to be expected.

Slide bearing application in the marine sector primarily involves a propeller shaft bearing present in the stern tube, called the stem tube bearing. The primary function of the propeller shaft is the transmission of the driving motion through the ship's hull to the propeller. The bearing here ensures low-friction movement.

In addition, there is lubrication of machines and machine components in offshore wind turbines, oil and gas production platforms, in harbor installations, shipyards and the like that come into contact with seawater, water and aqueous media.

These also include chains that are used, for example, in lock gates, cables, such as rope or cables that are employed in nets, and instruments for control of flows of solids, liquids and gases. It is likewise necessary to lubricate propellers, springs and valves in a wide variety of different apparatuses and machines.

In a preferred embodiment, the present invention therefore relates to the use of the lubricant composition of the invention as described herein as gear oil, roller bearing oil, hydraulic oil or slide bearing oil in the marine sector and in inland waterways, especially for lubrication of gears, hydraulics, propeller rudders, propeller shafts, linear guides, pneumatic components, instruments, bearings, such as slide bearings, roller bearings or stem tube bearings, chains, cables, springs, valves and propellers in machines, machine components and installations that come into contact with water (salt water and/or fresh water), and in land-based machines and machine elements that come into contact with water and/or aqueous media, wherein the lubricant composition preferably comprises:

an oil-soluble polyalkylene glycol;
in an amount of 0.1-85% by weight, based on the overall lubricant composition, an ester compound selected from the group of natural esters and synthetic esters, and combinations thereof; and in an amount of 0.1-20% by weight, based on the overall lubricant composition, an additive mixture comprising an antioxidant, an anticorrosive and optionally a nonferrous metal deactivator, wherein the anticorrosive is selected from neutral alkali metal and alkaline earth metal salts of sulfonic acids, carboxylic acids, naphthenic acids, naphthoic acids, benzoic acids and phosphoric acids, and derivatives and combinations thereof, and where the components present add up to a total of 100% by weight and are as defined above.

The lubricant compositions are produced by any of the methods known to the person skilled in the art, by mixing the base oil components (oil-soluble polyalkylene glycol(s), ester compound(s)) and the additives in a suitable vessel, for example a mixing tank, using a suitable stirrer. Solid additives or components are brought into solution and stirred in by increasing the temperature. Production can also be effected by means of continuous methods.

The present invention is described in more detail by the nonlimiting examples that follow.

EXAMPLES

General Test Methods Used

The properties of the lubricant composition and of the components present therein, if not known from the manufacturer, are determined by means of the following methods:

Determination of viscosity: viscosity measurements are effected according to ASTM D 7042 by means of a Stabinger SVM 3000 viscometer (Anton Paar).

Determination of acid number (TAN, total acid number [mg KOH/g]):

In order to determine the acid number, the sample is dissolved in a solvent mixture and then, according to ASTM D664-18E02, titrated with an alcoholic potassium hydroxide solution. The titration is conducted by potentiometry with the aid of a Solvotrode using a Metrohm 905 Titrando titration unit.

Determination of molecular weight ($M_n$):

Molecular weight is determined by means of GPC (gel permeation chromatography) against a polystyrene standard according to DIN 55672-1:2016-03 "Gel permeation chromatography (GPC)—Part 1: Tetrahydrofuran (THF) as elution solvent" using a SECcure GPC system.

Production of the Lubricant Compositions:

The lubricant compositions are produced by any of the methods known to the person skilled in the art, by mixing the base oil components (oil-soluble polyalkylene glycol(s), ester compound(s)) and the additives in a suitable vessel, for example a mixing tank, using a suitable stirrer. Solid additives or components are brought into solution and stirred in by increasing the temperature. Production can also be effected by means of continuous methods.

The following inventive (examples 1-5) and noninventive (comparative examples 1-11) formulations are produced as described above:

Example 1

|  | Chemistry 1 | Chemistry 2 | Proportion (% by wt.) |
|---|---|---|---|
| Base oil 1 | Oil-soluble polyalkylene glycol | Polyisobutylene oxide (iBO)-polyisopropylene oxide (iPO) copolymer; iBO:iPO 50:50, dodecanol-initiated | 19.0 |
| Base oil 2 | Pentaerythritol ester | Pentaerythritol tetraisostearate | 76.305 |
| Additive mixture | Anticorrosive | Neutral calcium sulfonate[1] (TAN < 10 mg KOH/g) | 4.695 |
|  | Antioxidant | Phenolic antioxidant[2] |  |
|  | Nonferrous metal deactivator | Benzotriazole derivative |  |
|  | Lubricity improver | Maleic acid-olefin copolymer |  |
|  | Defoamer | Silicone-containing defoamer |  |

Example 2

|  | Chemistry 1 | Chemistry 2 | Proportion (% by wt.) |
|---|---|---|---|
| Base oil 1 | Oil-soluble polyalkylene glycol | iBO-iPO copolymer; iBO:iPO 50:50, dodecanol-initiated | 19.5 |
| Base oil 2 | Pentaerythritol ester | Pentaerythritol tetraisostearate | 76.305 |
| Additive mixture | Anticorrosive | Neutral calcium sulfonate[1] (TAN < 10 mg KOH/g) | 4.195 |
|  | Antioxidant | Aminic antioxidant[3] |  |
|  | Nonferrous metal deactivator | Benzotriazole derivative |  |
|  | Lubricity improver | Maleic acid-olefin copolymer |  |
|  | Defoamer | Silicone-containing defoamer |  |

Example 3

|  | Chemistry 1 | Chemistry 2 | Proportion (% by wt.) |
|---|---|---|---|
| Base oil 1 | Oil-soluble polyalkylene glycol | iBO-iPO copolymer; iBO:iPO 50:50, dodecanol-initiated | 19.9 |
| Base oil 2 | Pentaerythritol ester | Pentaerythritol tetraisostearate | 76.305 |
| Additive mixture | Anticorrosive | Neutral calcium sulfonate[1] (TAN < 10 mg KOH/g) | 3.795 |
|  | Antioxidant | Aminic antioxidant[4] |  |
|  | Nonferrous metal deactivator | Benzotriazole derivative |  |
|  | Lubricity improver | Maleic acid-olefin copolymer |  |
|  | Defoamer | Silicone-containing defoamer |  |

Example 4

| | Chemistry 1 | Chemistry 2 | Proportion (% by wt.) |
|---|---|---|---|
| Base oil 1 | Oil-soluble polyalkylene glycol | iBO-iPO copolymer; iBO:iPO 50:50, dodecanol-initiated | 60.0 |
| Base oil 2 | Pentaerythritol complex ester | Pentaerythritol isostearate sebacate complex ester | 35.305 |
| Additive mixture | Anticorrosive | Neutral calcium sulfonate[1] (TAN < 10 mg KOH/g) | 4.695 |
| | Antioxidant | Phenolic antioxidant[2] | |
| | Nonferrous metal deactivator | Benzotriazole derivative | |
| | Lubricity improver | Maleic acid-olefin copolymer | |
| | Defoamer | Silicone-containing defoamer | |

Example 5

| | Chemistry 1 | Chemistry 2 | Proportion (% by wt.) |
|---|---|---|---|
| Base oil 1 | Oil-soluble polyalkylene glycol | iBO-iPO copolymer; iBO:iPO 50:50, dodecanol-initiated | 19.0 |
| Base oil 2 | Pentaerythritol ester | Pentaerythritol tetraisostearate | 75.805 |
| Additive mixture | Anticorrosive | Neutral calcium sulfonate[1] (TAN < 10 mgKOH/g) | 5.195 |
| | Antioxidant | Thiocarbamate[10] | |
| | Nonferrous metal deactivator | Benzotriazole derivative | |
| | Lubricity improver | Maleic acid-olefin copolymer | |
| | Defoamer | Silicone-containing defoamer | |

Comparative Example 1

| | Chemistry 1 | Chemistry 2 | Proportion (% by wt.) |
|---|---|---|---|
| Base oil 1 | Oil-soluble polyalkylene glycol | iBO-iPO-Copolymer; iBO:iPO 50:50, dodecanol-initiated | 19.5 |
| Base oil 2 | Pentaerythritol ester | Pentaerythritol tetraisostearate | 76.805 |
| Additive mixture | Anticorrosive | Neutral calcium sulfonate[1] (TAN < 10 mgKOH/g) | 3.695 |
| | Antioxidant | — | |
| | Nonferrous metal deactivator | Benzotriazole derivative | |
| | Lubricity improver | Maleic acid-olefin copolymer | |
| | Defoamer | Silicone-containing defoamer | |

Comparative Example 2

| | Chemistry 1 | Chemistry 2 | Proportion (% by wt.) |
|---|---|---|---|
| Base oil 1 | Oil-soluble polyalkylene glycol | iBO-iPO copolymer; iBO:iPO 50:50, dodecanol-initiated | 21 |
| Base oil 2 | Pentaerythritol ester | Pentaerythritol tetraisostearate | 74.705 |
| Additive mixture | Anticorrosive | Amine-neutralized phosphate[5]; sarcosine derivative[6] (TAN > 100 mg KOH/g) | 4.295 |
| | Antioxidant | Phenolic antioxidant[2] | |
| | Nonferrous metal deactivator | Benzotriazole derivative | |
| | Lubricity improver | Maleic acid-olefin copolymer | |
| | Defoamer | Silicone-containing defoamer | |

Comparative Example 3

| | Chemistry 1 | Chemistry 2 | Proportion (% by wt.) |
|---|---|---|---|
| Base oil 1 | Oil-soluble polyalkylene glycol | iBO-iPO copolymer; iBO:iPO 50:50, dodecanol-initiated | 19.0 |
| Base oil 2 | Pentaerythritol ester | Pentaerythritol tetraisostearate | 76.705 |
| Additive mixture | Anticorrosive | Carboxylic monoester[7]; sarcosine derivative[6] (TAN > 100 mg KOH/g) | 4.295 |
| | Antioxidant | Phenolic antioxidant[2] | |
| | Nonferrous metal deactivator | Benzotriazole derivative | |
| | Lubricity improver | Maleic acid-olefin copolymer | |
| | Defoamer | Silicone-containing defoamer | |

Comparative Example 4

| | Chemistry 1 | Chemistry 2 | Proportion (% by wt.) |
|---|---|---|---|
| Base oil 1 | Oil-soluble polyalkylene glycol | iBO-iPO copolymer; iBO:iPO 50:50, dodecanol-initiated | 19.0 |
| Base oil 2 | Pentaerythritol ester | Pentaerythritol tetraisostearate | 76.71 |
| Additive mixture | Anticorrosive | Carboxylic monoester[7] (TAN > 100 mg KOH/g) | 4.29 |
| | Antioxidant | Phenolic antioxidant | |
| | Nonferrous metal deactivator | Benzotriazole derivative | |
| | Lubricity improver | Maleic acid-olefin copolymer | |
| | Defoamer | Silicone-containing defoamer | |

Comparative Example 5

|  | Chemistry 1 | Chemistry 2 | Proportion (% by wt.) |
|---|---|---|---|
| Base oil 1 | Oil-soluble polyalkylene glycol | iBO-iPO copolymer; iBO:iPO 50:50, dodecanol-initiated | 19.71 |
| Base oil 2 | Pentaerythritol ester | Pentaerythritol tetraisostearate | 76.0 |
| Additive mixture | Anticorrosive | Carboxylic diester[8], carboxylic monoester[7] (TAN > 100 mg KOH/g) | 4.29 |
|  | Antioxidant | Phenolic antioxidant[2] |  |
|  | Nonferrous metal deactivator | Benzotriazole derivative |  |
|  | Lubricity improver | Maleic acid-olefin copolymer |  |
|  | Defoamer | Silicone-containing defoamer |  |

Comparative Example 6

|  | Chemistry 1 | Chemistry 2 | Proportion (% by wt.) |
|---|---|---|---|
| Base oil 1 | Oil-soluble polyalkylene glycol | iBO-iPO copolymer; iBO:iPO 50:50, dodecanol-initiated | 19.71 |
| Base oil 2 | Pentaerythritol ester | Pentaerythritol tetraisostearate | 76.0 |
| Additive mixture | Anticorrosive | Carboxylic monoester[9] (TAN > 100 mg KOH/g) | 4.29 |
|  | Antioxidant | Phenolic antioxidant[2] |  |
|  | Nonferrous metal deactivator | Benzotriazole derivative |  |
|  | Lubricity improver | Maleic acid-olefin copolymer |  |
|  | Defoamer | Silicone-containing defoamer |  |

Comparative Example 7

|  | Chemistry 1 | Chemistry 2 | Proportion (% by wt.) |
|---|---|---|---|
| Base oil 1 | Pentaerythritol ester | Pentaerythritol tetraisostearate | 51.764 |
| Base oil 2 | Pentaerythritol ester | Pentaerythritol tetraoleate | 43.041 |
| Additive mixture | Anticorrosive | Neutral calcium sulfonate[1] (TAN < 10 mg KOH/g) | 5.195 |
|  | Antioxidant | Thiocarbamate[10] |  |
|  | Nonferrous metal deactivator | Benzotriazole derivative |  |
|  | Lubricity improver | Maleic acid-olefin copolymer |  |
|  | Defoamer | Silicone-containing defoamer |  |

Comparative Example 8

|  | Chemistry 1 | Chemistry 2 | Proportion (% by wt.) |
|---|---|---|---|
| Base oil 1 | Pentaerythritol ester | Pentaerythritol tetraoleate | 43.041 |
| Base oil 2 | Pentaerythritol ester | Pentaerythritol tetraisostearate | 52.264 |
| Additive mixture | Anticorrosive | Neutral calcium sulfonate[1] (TAN < 10 mg KOH/g) | 4.695 |
|  | Antioxidant | Phenolic antioxidant[2] |  |
|  | Nonferrous metal deactivator | Benzotriazole derivative |  |
|  | Lubricity improver | Maleic acid-olefin copolymer |  |
|  | Defoamer | Silicone-containing defoamer |  |

Comparative Example 9

|  | Chemistry 1 | Chemistry 2 | Proportion (% by wt.) |
|---|---|---|---|
| Base oil 1 | Pentaerythritol ester | Pentaerythritol tetraoleate | 44.541 |
| Base oil 2 | Pentaerythritol ester | Pentaerythritol tetraisostearate | 51.664 |
| Additive mixture | Anticorrosive | Neutral calcium sulfonate[1] (TAN < 10 mg KOH/g) | 3.795 |
|  | Antioxidant | Aminic antioxidant[4] |  |
|  | Nonferrous metal deactivator | Benzotriazole derivative |  |
|  | Lubricity improver | Maleic acid-olefin copolymer |  |
|  | Defoamer | Silicone-containing defoamer |  |

Comparative Example 10

|  | Chemistry 1 | Chemistry 2 | Proportion (% by wt.) |
|---|---|---|---|
| Base oil 1 | Polyalkylene glycol | Polypropylene glycol[11] | 68.48 |
| Base oil 2 | Pentaerythritol ester | Pentaerythritol tetraisostearate | 29.32 |
| Additive mixture | Anticorrosive | Basic barium sulfonate[12] | 2.20 |
|  | Antioxidant | Aminic antioxidant[4] |  |
|  | Nonferrous metal deactivator | Benzotriazole (CAS No. 95-14-7) |  |

Comparative Example 11

|  | Chemistry 1 | Chemistry 2 | Proportion (% by wt.) |
|---|---|---|---|
| Base oil 1 | Polyalkylene glycol | Polypropylene glycol[11] | 68.48 |
| Base oil 2 | Trimethylolpropane ester | Trimethylolpropane fatty acid ester (predominantly C18-subst.) | 29.32 |

-continued

|  | Chemistry 1 | Chemistry 2 | Proportion (% by wt.) |
|---|---|---|---|
| Additive mixture | Anticorrosive Antioxidant Nonferrous metal deactivator | Basic barium sulfonate[12] Aminic antioxidant[4] Benzotriazole (CAS No. 95-14-7) | 2.20 |

[1]neutral alkylnaphthalenesulfonic acid calcium salt (NA-SUL® CA-770 FG); [2]octadecyl 3-(3,5-di-tert-butyl-4-hydroxyphenyl)propionate (CAS No. 2082-79-3); [3]benzeneamine, N-phenyl-, reaction products with 2,4,4-trimethylpentene (CAS No. 68411-46-1); [4]bis(4-(3-tetramethylbutyl)phenyl)amine (CAS No. 15721-78-5); [5]amine, C11-14-branched alkyl, monohexyl and dihexyl phosphate (CAS No. 80939-62-4); [6]N-oleoylsarcosine; [7]2-(tetrapropenyl)succinic acid, monoester with propane-1,2-diol (CAS No. 52305-09-6); [8](tetrapropenyl)succinic acid (CAS No. 27859-58-1); [9]reaction products of dihydro-3-(tetrapropenyl)furan-2,5-dione with propane-1,2-diol (EC No. 947-696-0); [10]4,4'-methylenebis(dibutyl dithiocarbamate) (CAS No. 10254-57-6); [11]polypropylene glycol monobutyl ether, n-butanol-initiated (Synalox™ 100-40B DOW, Mn 1100 g/mol); [12]barium bis(dinonylnaphthalenesulfonate) in mineral oil (CAS No. 25619-56-1; King Industries Na-Sul® BSN, pH 10)

Example 6—Determination of Elastomer Compatibility

In the selection of a suitable elastomer material, as well as the temperature use range, consideration of the chemical and physical stability of the elastomer is frequently also crucial. The elastomers are subject to aging and wearing effects that are in turn crucial to lifespan in the application.

In order to ascertain elastomer compatibility with respect to lubricants, elastomer test specimens (NBR and FKM test specimens) are stored in formulations of examples 1-5 and of comparative examples 1-7, and the effect of the respective formulation on the elastomer material is examined. A measure determined for elastomer compatibility is the changing material properties such as hardness, weight, volume, tensile strength or elongation at break after storage in the lubricant compared to the state as supplied.

Storage tests are conducted both in pure lubricant oil and in an oil-water emulsion using commercial equipment.

The storage tests in pure lubricant oil were conducted in accordance with standard DIN ISO 1817 (DIN ISO 1817:2016-11). The following elastomer test specimens were exposed to the pure lubricant oil under the following test conditions:

FKM: 80 FKM 10061: 168 h/150° C.;
85 FKM 245601: 168 h/150° C.
NBR: ISO 6072 NBR 1: 1000 h/100° C.

The storage tests in oil-water emulsions are conducted in accordance with DIN ISO 1817 (DIN ISO 1817:2016-11). In a suitable test vessel (e.g. flat flange beaker with groove 2000 ml DN 120, with DN 120 flat flange lid), the test oil is admixed with 5% of distilled water (for 1600 ml of oil: 85 ml of water; for 1800 ml of oil: 95 ml of water) and stirred until a homogeneous state is attained. The test specimens are immersed completely into the test oil and arranged in such a way that the distance from the lateral walls of the test vessel is at least 5 mm, and at least 10 mm from the base of the vessel and from the surface of the test oil. After introduction of a contact thermometer and a reflux condenser, the test vessel is closed in order to prevent loss of water, and the medium is heated with constant stirring. The following elastomer specimens are exposed to an oil-water emulsion on the following test conditions:

FKM: 80 FKM 10061: 336 h/80° C.

After the contact time in the pure lubricant oil or oil-water emulsion has elapsed, the test specimens are left to cool and cleaned. Subsequently, according to the respectively applicable standards, changes in hardness, weight, volume, tensile strength and/or elongation at break of the elastomers after storage in the lubricant are determined by comparison with the state as supplied:

Change in volume, change in weight: each determined to DIN ISO 1817 (DIN ISO 1817:2016-11) Elastomers—Determination of the effect on liquids The change in volume or weight of the test specimens gives information as to the migration of the test liquid into the material or the leaching or possibly even dissolution of the material.

Change in Shore A hardness: determined according to DIN ISO 7619-1 (DIN ISO 7619-1:2012-02) Elastomers or thermoplastic elastomers—Determination of indentation hardness—Part 1: Durometer method (Shore A hardness)

Hardness is generally understood to mean the mechanical resistance of the material on penetration of a harder test specimen.

Change in tensile strength and elongation at break: each determined according to DIN 53504 (DIN 53504:2017-03)—Testing of rubber and elastomers—Determination of tensile strength at break, tensile stress at yield, elongation at break and stress values in a tensile test The test results for static elastomer storage in pure lubricant oil are given in tables 1 to 3 below:

TABLE 1a

| (80 FKM 10061/150° C./168 h): | | | | |
|---|---|---|---|---|
| Parameter | Example 1 | Example 2 | Example 3 | Comparative example 1 |
| Change in weight, % | 0.3 | 0.4 | 0.4 | Not measurable |
| Change in volume, % | 0.9 | 0.5 | 0.5 | Not measurable |
| Change in Shore A hardness | 0 | 0 | 0 | Not measurable |
| Change in tensile strength, % | −2 | 6 | 9 | Not measurable |
| Change in elongation at break, % | −16 | 17 | 21 | Not measurable |

TABLE 1b (85 FKM 245601/150° C./168 h):

| Parameter | Example 1 | Example 2 | Example 3 | Comparative example 1 |
|---|---|---|---|---|
| Change in weight, % | 0.1 | 0.1 | 0.1 | Not measurable |
| Change in volume, % | 0.2 | 0.3 | 0.2 | Not measurable |
| Change in Shore A hardness | 0 | −1 | −1 | Not measurable |
| Change in tensile strength, % | −8 | −8 | −11 | Not measurable |
| Change in elongation at break, % | −6 | −5 | −9 | Not measurable |

As can be inferred from tables 1a and 1b, the test specimens after storage in the inventive lubricant compositions of examples 1, 2 and 3, each of which comprise an OSP, an antioxidant and a neutral anticorrosive, show only small changes in volume, weight, Shore A hardness, tensile strength and elongation at break, which means good elastomer compatibility of the lubricant compositions. By contrast, the lubricant composition according to comparative example 1, which comprises an OSP and a neutral anticorrosive but no antioxidant, does not lead to measurable results since the lubricant composition begins to break down even before the end of the test under the conditions chosen. The results show a synergistic effect between the components of the lubricants of the invention.

TABLE 2

(80 FKM 10061/150° C./168 h):

| Parameter | Ex. 1 | Comp. Ex. 2 | Comp. Ex. 3 | Comp. Ex. 4 | Comp. Ex. 5 | Comp. Ex. 6 |
|---|---|---|---|---|---|---|
| Change in tensile strength, % | −2 | −25 | −21 | −24 | −9 | −12 |
| Change in elongation at break, % | −16 | −46 | −40 | −52 | −42 | −44 |

As can be inferred from table 2, the test specimen after storage in the lubricant composition of the invention from example 1 that comprises an OSP, an antioxidant and a neutral anticorrosive (TAN<10 mg KOH/g) shows much smaller changes in tensile strength and elongation at break compared to storage in the lubricant compositions of the comparative examples which, as well as OSP and antioxidants, contain acidic anticorrosives (TAN>100 mg KOH/g). The results show a synergistic effect between the components of the lubricant of the invention to the effect that elastomer compatibility can be improved in the case of selection of a suitable anticorrosive.

TABLE 3

(ISO 6072 NBR 1/100 C./1000 h):

| Parameter | Example 1 | Example 4 |
|---|---|---|
| Change in weight, % | 4.8 | 5.8 |
| Change in volume, % | 5.6 | 6.5 |
| Change in Shore A hardness, | 1 | −2 |
| Change in tensile strength, % | −28 | −18 |
| Change in elongation at break, % | −54 | −40 |

As can be inferred from table 3, the test specimens after storage in the lubricant compositions of the invention from examples 1 and 4 show comparable changes with regard to weight, volume and Shore A hardness, whereas storage in the lubricant compositions from example 4 leads to a smaller change in tensile strength and elongation at break in the test specimen. The results show that the increase in the proportion of OSP in the lubricant composition according to example 4 leads to a further increase in compatibility of the lubricant composition with respect to NBR.

Test results of the static elastomer storage in oil-water emulsions are reported in table 4 below:

TABLE 4

(80 FKM 10061/oil + 5% water; 80° C.; 336 h)

| Parameter | Ex. 1 | Ex. 3 | Ex. 5 | Comp. Ex. 7 | Comp. Ex. 8 | Comp. Ex. 9 | Comp. Ex. 10 | Comp. Ex. 11 |
|---|---|---|---|---|---|---|---|---|
| Change in weight, % | 2.2 | 2.3 | 2.7 | 7.9 | 6.1 | 11.6 | 4.3 | 8.2 |
| Change in volume, % | 3.1 | 2.8 | 3.8 | 13.9 | 10.6 | 20.5 | 6.6 | 14.2 |

As can be inferred from table 4, in the case of the lubricant compositions of the invention from examples 1, 3 and 5 that comprise both an ester and an OSP as base oil components, by contrast with comparative examples 7-11, only small changes in weight and volume are observed, which means elevated elastomer compatibility. In particular, a comparison of the test results with formulations from comparative examples 7, 8 and 9 that contain solely ester as base oil component, with otherwise identical additives (see, in particular, example 1/comparative example 8, example 3/comparative example 9, example 5/comparative example 7), shows that the absence of an OSP leads to poorer values with regard to the change in weight and especially change in volume of the test specimen, and hence to reduced elastomer compatibility. The formulations of comparative examples 10 and 11 comprise a basic anticorrosive.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A lubricant composition comprising
an oil-soluble polyalkylene glycol, as a base oil component;
an ester compound selected from the group of natural esters and synthetic esters, and combinations thereof, as another base oil component; and
an additive mixture comprising an antioxidant and an anticorrosive,
wherein the anticorrosive is selected from neutral alkali metal and alkaline earth metal salts of sulfonic acids and derivatives and combinations thereof, wherein the neutral alkali metal and alkaline earth metal salts are Na, Ca, K and Mg salts,
wherein the anticorrosive has a total acid number (TAN) of 30 mg KOH/g or less,
wherein the oil-soluble polyalkylene glycol has a molecular weight $M_n$ of 500 g/mol or more to 1400 g/mol or less,
wherein the oil-soluble polyalkylene glycol and the ester compound are the only base oil components comprised in the lubricant composition,
wherein the weight ratio of oil-soluble polyalkylene glycol to the ester compound based on the total weight of those two base oil components in the lubricant composition is in the range from 15:85 to 70:30,
wherein the lubricant composition does not comprise an overbased alkali metal or alkaline earth metal salt,
wherein the oil-soluble polyalkylene glycol is a copolymer selected from polybutylene oxide-polypropylene oxide copolymers, polybutylene oxide-polyethylene oxide copolymers and polybutylene oxide-polypropylene oxide-polyethylene oxide copolymers, and combinations thereof,
wherein the amount of oil-soluble polyalkylene glycol is 5-70% by weight,
wherein the amount of the antioxidant is in the range of 0.05-3.5% by weight, and
wherein the amount of the anticorrosive is in the range of 0.05-3.5% by weight.

2. The lubricant composition as claimed in claim 1, wherein the antioxidant is selected from phenolic antioxidants, aminic antioxidants, phosphites and sulfur-containing compounds, and combinations thereof.

3. The lubricant composition as claimed in claim 1, wherein the antioxidant is selected from phenolic antioxidants, aminic antioxidants, thiocarbamates and dithiocarbamates, and combinations thereof.

4. The lubricant composition as claimed in claim 1, wherein the antioxidant is selected from aminic antioxidants.

5. The lubricant composition as claimed in claim 1, wherein the additive mixture further comprises a nonferrous metal deactivator selected from triazoles, mercaptothiadiazoles and salicylates, and combinations thereof.

6. The lubricant composition as claimed in claim 5, wherein the nonferrous metal deactivator is selected from triazoles.

7. The lubricant composition as claimed in claim 1, wherein the ester compound is selected from natural glyceride esters, optionally from the group of sunflower oil, rapeseed oil or colza oil, linseed oil, corn oil, safflower oil, soybean oil, linseed oil, peanut oil, "*lesquerella*" oil, palm oil, olive oil, in monomeric, oligomeric and/or polymerized form; and synthetic esters from the group of polyol esters, polyol complex esters, complex esters of dimer acids, dimer acid esters, aliphatic carboxylic acid and dicarboxylic esters, phosphate esters and trimellitic and pyromellitic esters and estolides; and combinations thereof.

8. The lubricant composition as claimed in claim 1, wherein the ester compound is selected from polyol esters and polyol complex esters, and combinations thereof.

9. The lubricant composition as claimed in claim 1, wherein the ester compound is selected from neopentyl glycol esters, trimethylolpropane esters and pentaerythritol esters that have been esterified with saturated and/or mono- or polyunsaturated, linear and/or branched monocarboxylic acids of chain length C4-C36; and neopentyl glycol complex esters, trimethylolpropane complex esters and pentaerythritol complex esters that have been fully esterified with saturated and/or mono- or polyunsaturated, linear and/or branched monocarboxylic acids of chain length C4-C36 and with saturated and/or mono- or polyunsaturated, linear and/or branched dicarboxylic acids of chain length C4-C36 in any mixture; and combinations thereof.

10. The lubricant composition as claimed in claim 9, wherein the neopentyl glycol esters, trimethylolpropane esters and pentaerythritol esters have each been esterified with saturated and/or mono- or polyunsaturated, linear and/or branched monocarboxylic acids of chain length C18-C36; and the neopentyl glycol complex esters, trimethylolpropane complex esters and pentaerythritol esters have each been fully esterified or partly esterified with saturated and/or mono- or polyunsaturated, linear and/or branched monocarboxylic acids of chain length C18-C36 and with saturated and/or mono- or polyunsaturated, linear and/or branched dicarboxylic acids of chain length C4-C36 in any mixture.

11. The lubricant composition as claimed in claim 1, wherein the oil-soluble polyalkylene glycol is a copolymer selected from polyisobutylene oxide-polyisopropylene oxide copolymers, polyisobutylene oxide-polyethylene oxide copolymers and polyisobutylene oxide-polyisopropylene oxide-polyethylene oxide copolymers, and combinations thereof.

12. The lubricant composition as claimed in claim 1, wherein the oil-soluble polyalkylene glycol is an alcohol-initiated copolymer, optionally wherein the alcohol-initiated copolymer is a copolymer having a C10-C20-alkyl radical bonded to at least one terminal end thereof.

13. The lubricant composition as claimed in claim 1, wherein the ester compound is present in an amount of 0.1-85% by weight, based on the overall lubricant composition.

14. The lubricant composition as claimed in claim 1, wherein the additive mixture is present in an amount of 0.1-20% by weight, based on the overall lubricant composition.

15. The lubricant composition as claimed in claim 1, wherein the additive mixture further comprises one or more additives selected from antiwear agents, friction modifiers, high-pressure additives, ion complex formers, solid lubricants, dispersants, pour point and viscosity improvers, UV stabilizers, emulsifiers, color indicators, lubricity improvers and defoamers.

16. A system comprising the lubricant composition as claimed in claim 1, wherein the system is selected from a gear, hydraulics, a propeller rudder, a propeller shaft, a linear guide, a pneumatic component, an instrument, a bearing, a chain, a cable, a spring, a valve, and a machine component, optionally wherein the system is configured to come into contact with water and/or aqueous media in a marine sector, in inland waterways, or on land.

17. The lubricant composition as claimed in claim 1, wherein the anticorrosive has a total acid number (TAN) of 10 mg KOH/g or less.

18. The lubricant composition as claimed in claim 1, wherein the neutral alkali metal and alkaline earth metal salts are Ca salts.

* * * * *